United States Patent [19]
Layton et al.

[11] Patent Number: 5,674,568
[45] Date of Patent: Oct. 7, 1997

[54] TREATMENT OF CELLULOSIC FIBER PRODUCTS

[75] Inventors: Heber D. Layton, Aliquippa; John W. Frink, Coraopolis; Howard S. Duff, Rochester, all of Pa.; Karl W. Haider, New Martinsville, W. Va.

[73] Assignee: Bayer Corporation, Pittsburgh, Pa.

[21] Appl. No.: 538,663

[22] Filed: Oct. 3, 1995

[51] Int. Cl.$^6$ ........................................ B05D 7/00
[52] U.S. Cl. ................ 427/389.9; 427/285; 427/288; 427/392; 428/423.1; 527/301
[58] Field of Search ............... 527/301, 34; 427/411, 427/415, 285, 288; 428/423.1

[56] References Cited

U.S. PATENT DOCUMENTS

| | | | |
|---|---|---|---|
| 3,617,189 | 11/1971 | Wagner et al. | 8/116.2 |
| 3,666,593 | 5/1972 | Lee | 156/285 |
| 4,100,328 | 7/1978 | Gallagher | 428/407 |
| 4,576,771 | 3/1986 | Scholl et al. | 264/109 |
| 4,617,223 | 10/1986 | Hiscock et al. | 428/211 |
| 5,008,359 | 4/1991 | Hunter | 527/103 |
| 5,140,086 | 8/1992 | Hunter et al. | 527/103 |
| 5,143,768 | 9/1992 | Wilderman | 428/68 |
| 5,204,176 | 4/1993 | Seiss et al. | 428/304.4 |
| 5,332,458 | 7/1994 | Wallick | 156/210 |

OTHER PUBLICATIONS

Ball et al, "Particleboard binder promises performance without emissions," Forest Industries, Apr. 1979, pp. 76–79, and 117.

Gaul et al, "Novel Isocyanate Binder Systems for Composite Wood Panels," Journal of Elastomer and Plastics, vol. 16, Jul 1984, pp. 206–228.

*Primary Examiner*—James J. Seidleck
*Assistant Examiner*—Duc Truong
*Attorney, Agent, or Firm*—Joseph C. Gil; Noland J. Cheung

[57] ABSTRACT

The present invention is directed to a process for the production of a modified cellulosic product by:

1) coating or impregnating a composition of:
   a) a polymethylene poly(phenyl isocyanate),
   b) water, and
   c) an organic compound having an hydroxy functionality of from 2 to 8, and having a molecular weight of from about 60 to about 8000, and being selected from the group consisting of i) ester group-free polyhydric alcohols, ii) polyether polyols and iii) mixtures thereof, and 2) allowing the impregnated cellulosic material to cure at room temperature and without application of pressure.

3 Claims, No Drawings

TREATMENT OF CELLULOSIC FIBER PRODUCTS

BACKGROUND OF THE INVENTION

Corrugated boxes and other products made from cellulosic fibers are very susceptible to strength loss when exposed to water or high humidity conditions. For example, the hot humid conditions frequently encountered in storage warehouses cause serious strength losses. As a general principle, corrugated boxes lose almost 50% of their stacking strength in warehouses. This necessarily means that the engineered strength must be twice the required in-service strength.

Treatments which improve the humid aging strength of the raw materials used to make corrugated boxes and other products made from cellulosic fibers will minimize the strength loss noted above, and will allow reduction of the amount of fiber necessary to fabricate the final product. Such a treatment would also allow the use of boxes and other such products in a wider variety of severe service applications.

It is known to treat cellulosic materials with polymethylene poly(phenyl isocyanates) ("polymeric MDI") to improve the strength of the product. Typically, such treatment involves applying the isocyanate to the material and allowing the isocyanate to cure, either by application of heat and pressure (see, e.g., U.S. Pat. Nos. 3,666,593, 5,008,359, 5,140,086, 5,143,768 and 5,204,176) or at room temperature (see, e.g., U.S. Pat. Nos. 4,617,223 and 5,332,458). While it is possible to allow the polymeric MDI to cure under ambient conditions, residual isocyanate groups remain on the treated products for weeks or even months in some instances. It is also known to utilize tolylene diisocyanate for such use.

U.S. Pat. No. 3,617,189 describes the treatment of a cellulosic material to enhance water repellency with an aqueous emulsion of a soap, a surface active agent, water and polymeric MDI, where a portion of the isocyanate groups of the polymeric MDI are reacted with a monoalcohol. The composition is then cured with water at elevated temperatures.

Finally, it is known that aqueous isocyanate-based emulsions can be used as binders to prepare panels from lignocellulosic materials (see, e.g., U.S. Pat. Nos. 4,100,328 and 4,576,771; Ball et al, "Particle board binder promises performance without emissions," FOREST INDUSTRIES, April 1979, pages 76–79, 117; and, Gaul et al, "Novel Isocyanate Binder Systems for Composite Wood Panels," JOURNAL OF ELASTOMERS AND PLASTICS, Vol 16, July 1984, pages 206–228).

DESCRIPTION OF THE INVENTION

The present invention is directed to the discovery of a system which can be cured without the application of heat and pressure and which allows for the production of a treated product which exhibits a very low amount of residual isocyanate groups. More particularly, the present invention is directed to a process for the production of a modified cellulosic product comprising:

1) coating or impregnating a cellulosic material with from 1 to 30% by weight, based upon the weight of the cellulosic material, of a composition comprising:
   a) from about 62 to about 98% by weight of a polymethylene poly(phenyl isocyanate) having an isocyanate group content of from about 28 to about 33% by weight,
   b) from about 1 to about 28% by weight of water, and
   c) from about 1 to about 17 by weight of an organic compound having an hydroxy functionality of from 2 to 8, and having a molecular weight of from about 60 to about 8000, and being selected from the group consisting of i) ester group-free polyhydric alcohols, ii) polyether polyols and iii) mixtures thereof, with the %'s by weight of components a), b) and c) totalling 100%, and 2) allowing the impregnated cellulosic material to cure at room temperature and without application of pressure.

All molecular weights referred to herein are number average molecular weights ($M_n$) and are determined by end group analysis.

It has been found that use of the composition described above allows for the production of treated products which have enhanced moisture resistance and strength properties.

The materials used in treating the composition are known in the art. The isocyanate used must be a polymethylene poly(phenyl isocyanate) having an isocyanate group content of from about 28 to about 33% by weight, and preferably from about 31 to about 32% by weight. As is known in the art, polymethylene poly(phenyl isocyanates) are generally mixtures of methylene bis(phenyl isocyanates) and higher functional oligomers. Typically, the diisocyanate (which is generally a mixture of the 4,4'-, the 2,4'- and the 2,2'-isomers) amounts to from about 40 to about 50% by weight of the polymethylene poly(phenyl isocyanate), with the balance being higher oligomers.

The polyhydric alcohols and polyether polyols useful herein are also known in the polyurethane art. Useful polyhydric alcohols and polyether polyols have molecular weights of from about 60 to about 8000 and hydroxy functionalities of from 2 to 8. Preferred are polyether polyols known in the art. Suitable polyethers may be prepared by reacting one or more alkylene oxides having from 2 to 4 carbon atoms in the alkylene radical, with an initiator molecule which contains at least two active hydrogen atoms. Examples of alkylene oxides include ethylene oxide, 1,2-propylene oxide, epichlorohydrin and 1,2- and 2,3-butylene oxide. Ethylene oxide, propylene oxide and mixtures of 1,2-propylene oxide and ethylene oxide are preferably used. The alkylene oxides may be used individually, in sequence with one another, or as mixtures. Examples of initiator molecules include water; aminoalcohols such as N-alkyldiethanolamine, e.g. N-methyldiethanol-amine; amines such as tolylene diamine and ethylene diamine; diols, such as ethyleneglycol, 1,3-propyleneglycol, butane-1,4-diol and hexane-1,6-diol; and higher functional alcohols such as glycerin, trimethylol-propane, sorbitol and sucrose. Mixtures of initiator molecules may also be used. They may be used both individually or in the form of mixtures with one another. Examples of polyhydric alcohols free of ester groups include polyols having from 2 to 10, and preferably from 2 to 6 carbon atoms, such as ethyleneglycol, diethyleneglycol, butane-1,4-diol, pentane-1,5-diol, hexane-1,6-diol, decane-1,10-diol, 2,2-dimethylpropane-1,3-diol, propane-1,3-diol, dipropyleneglycol, glycerin, trimethylolpropane, and relatively low molecular weight alkylene oxide adducts thereof. The polyhydric alcohols may, depending on the required properties, be used either alone or in mixture with one another. In addition, mixtures of the polyether polyols and polyhydric alcohols may be used. The preferred organic compounds have molecular weights of from about 100 to about 4000.

The treating compositions herein are prepared by adding the water to the isocyanate with rapid stirring. The polyhydric alcohol or polyether polyol is then added. Alternatively, the alcohol or polyol can first be dissolved in the water, and the mixture can then be added to the isocyanate with rapid stirring. The composition is then applied to the cellulosic material to be treated by spraying, roll coating, dipping or any other coating method known in the art. Useful coating rates are in the range of from 1 to 30 pounds per one thousand square feet of cellulosic product or from 1 to 30% by weight, based upon the weight of the cellulosic material. Heat and pressure are not applied, and the composition typically is cured within about 24 hours at room temperature.

In the Examples which follow, the following materials were used:

Mondur 541: a commercially available polymethylene poly (phenyl isocyanate) from Bayer Corporation, having an isocyanate group content of 31.5% by weight and a viscosity at 25° C. of 200 mPa.s.

BDO: 1.4.-butane diol.

M-7057: Multranol 7057, a commercially available 3000 molecular weight polyoxypropylene triol modified with ethylene oxide from Bayer Corporation, having an OH number of 56.

RES D-2029: a commercially available aromatic polyester polyol from Cape Industries, having a functionality of about 2 and a hydroxyl number of from about 320 to 360.

M-9168: an ethylene diamine/propylene oxide adduct having a molecular weight of about 3740 and an OH number of 60.

The invention is further illustrated but is not intended to be limited by the following examples in which all parts and percentages are by weight unless otherwise specified.

EXAMPLES

Example 1

100 parts of Mondur 541 was stirred rapidly with a bench-top mixer. Ten parts of water was slowly added to the vortex. A stable emulsion (no phase separation occurred until solidification occurred several hours later) was formed with a useable viscosity (sprayable and spreadable with a wire wrapped draw-down rod) for at least 4 hours. After the water-in-isocyanate emulsion was formed, 10 parts of BDO was thoroughly stirred into the emulsion. The resulting composition was viscosity useable for at least two hours. This composition was coated at the rate of 6.5 lbs/1000 square feet (about 31 kg/1000 square meters) of paper (based on the weight of isocyanate) on to 18 lb/Mft$^2$ kraft paper (about 86 kg/Mm$^2$) with a #12 wire wrapped rod. The treated paper was allowed to sit on the lab bench at ambient temperature for several days.

Cobb Ring test samples were then prepared with treated and untreated paper. This was done by gluing a 2 inch (5.1 cm) tall piece of 4 inch (10.2 cm) diameter PVC pipe to the surface of a six inch (15.3 cm) square piece of the paper with silicone sealant. Water was added to a depth of one inch (2.55 cm) and the test sample weighed. The test sample was placed so that any water penetrating through the paper was drained away. After 24 hours the test sample was reweighed and the water loss was calculated. The results of the Cobb Ring test are shown in the following Table I:

TABLE 1

|  | Water added Cobb Ring | 25 hour Water loss | % Water loss |
|---|---|---|---|
| Untreated Paper | 212.4 grams | 47.6 grams | 22 |
| Treated Paper | 206.8 grams | 22.6 grams | 11 |

Example 2

The procedure for forming the composition in Example 1 was repeated. A #12 rod was used to apply 8 lbs/1000 square feet (38 kg/1000 square meters) of paper (based on weight of isocyanate) onto 40 lb/Mft$^2$ (192 kg/Mm$^2$) kraft liner board. The treated liner board was allowed to sit on the lab bench at ambient temperature for several days. Ring Crush samples (test method TAPPI T 818om-87) were then cut and tested. The results of untreated controls and treated liner board before and after humid aging for 24 hours at 25° C./90% relative humidity are shown in the Table 2.

Example 3

Corrugated board stock was immersed in the composition of Example 1. The amount of composition added was 30% as measured by the weight gain after drip drying. The treated and untreated control were tested for Box Edge Crush (test method TAPPI T823). The results are shown in Table 2.

TABLE 2

|  | Original | Humid aged |
|---|---|---|
| Ring Crush - Example 2 | | |
| Control | 90 lbs (41 kg) | 47 lbs (21 kg) |
| Treated | 164 lbs (75 kg) | 108 lbs (49 kg) |
| Box Edge Crush - Example 3 | | |
| Control | 70 psi (482 kPa) | |
| Treated | 300 psi (2,068 kPa) | |

Example 4

The procedures for forming the composition for Example 1 were repeated. It was spray applied to the surfaces of a paperboard product commercially available as "Spaceboard" (from Gridcore Systems International Corporation), at the rate of approximately 0.01 lbs/ft$^2$ (0.48 kg/m$^2$). This product was supplied by the U.S. Forest Products Laboratory in Madison, Wis. and returned to them after sitting in the machine area for several days. Physical properties were determined for treated and untreated "Spaceboard". The results are shown in the following Table 3:

TABLE 3

| Property | Untreated Control | Treated Product |
|---|---|---|
| Bending load, test method TAPPI T820 | 65 N | 105 N |
| Flat crush, test method ASTM C365 | 260 kPa | 720 kPa |
| Z-direction tensile, test method ASTM C297, modified slightly | 102 kPa | 255 kPa |
| Shear, ASTM C273 | 286 lbs (130 kg) | 821 lbs (373 kg) |

The modifications to test method ASTM C297 were as follows: Wooden blocks, which were machined flat, were used to bond test specimens. Eye bolts attached to the center of the wooden blocks were used to attach specimens to the test apparatus.

Examples 5 and 6 address the effect of the addition of polyhydric alcohols to the compositions described above. As noted above, a large amount of unreacted NCO groups on the paper products that are allowed to cure at ambient conditions is found with prior art systems. As demonstrated herein, the addition of the polyhydric alcohols significantly reduces the amount of unreacted isocyanate groups without the necessity of using heat and pressure.

Example 5

The procedures of Example 1 were used to prepare a number of compositions using various polyhydric alcohols. The amounts of isocyanate and water were as indicated in Example 1. Each was placed in a temperature bath at 100° C. to test the effects of the alcohols on the reactivity of the isocyanate with water in a heated water emulsion.

Measures of reactivity recorded reaction exotherm and the rate of exetherm development. The reactivity profile is characterized by the times required to reach 100° C., to reach peak temperature and to reach maximum exotherm development rate, respectively. The peak temperature is also recorded.

The results are set forth in the following Table 4. All % s noted in the table are % by weight based upon the total composition (i.e., isocyanate, water and additive). The example using Res-D-2029 is a comparative example.

TABLE 4

| Alcohol | Time to reach 100° C. minutes | Time to reach peak temp. minutes | Peak temp. °C. | Time to reach Max rate minutes |
|---|---|---|---|---|
| None | 14.5 | 16.75 | 122 | 15 |
| 1% BDO | 10.5 | 13.75 | 128 | 10 |
| 2% BDO | 9.75 | 13.5 | 130 | 10.25 |
| 4% BDO | 7.75 | 16.25 | 140 | 4.5 |
| 6% BDO | 7 | 17.75 | 132 | 6 |
| 32% BDO | 4.25 | 9 | 140 | 9 |
| 10% M7057 | 6.75 | 6.75 | 138 | 10.75 |
| 4% Res D-2029 | 14.5 | 21.5 | 137 | 12.75 |
| 1% M-9168 | 13.25 | 8.25 | 140 | 20.75 |
| 5% M-9168 | 8.5 | 6.75 | 133 | 13.25 |
| 10% M-9168 | 5.75 | 5 | 134 | 8.75 |

Example 5 shows that polyhydric alcohols increase the reactivity of the isocyanate with water Example 6

The procedure of Example 1 was followed to prepare the compositions listed in Table 5. Each composition was drawn into a 10 mil film on a glass plate and then allowed to sit in a 100% RH chamber at ambient temperature. At the indicated time interval a sample of the film was taken from the plate. The sample was dispersed in fluorolube, and an IR spectrum was recorded in transmission mode. The data in Table 5 shows that the polyhydric alcohols accelerate the disappearance of NCO groups at ambient temperature.

TABLE 5

| Formulation | Time (hours) | $(2270 \text{ cm}^{-1})$/ A $(2917 \text{ cm}^{-1})$ |
|---|---|---|
| Mondur 541:water (90:10 pbw) | 0 | 17 |
|  | 48 | 11 |
|  | 168 | 5 |
| Mondur 541:M-9168:water (90:10:10 pbw) | 0 | 10 |
|  | 48 | 5 |
|  | 168 | 1 |
| Mondur 541:BDO:water (90:10:10 pbw) | 0 | 18 |
|  | 48 | 5 |
|  | 168 | 3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a modified cellulosic product comprising:

1) coating or impregnating a cellulosic material with from 1 to 30% by weight, based upon the weight of the cellulosic material, of a composition comprising:
    a) from about 62 to about 98% by weight of a polymethylene poly(phenyl isocyanate) having an isocyanate group content of from about 28 to about 33% by weight,
    b) from about 1 to about 28% by weight of water, and
    c) from about 1 to about 17 by weight of an organic compound having an hydroxy functionality of from 2 to 8, and having a molecular weight of from about 60 to about 8000, and being selected from the group consisting of i) ester group-free polyhydric alcohols, ii) polyether polyols and iii) mixtures thereof, with the % s by weight of components a), b) and c) totalling 100%, and
  2) allowing the impregnated cellulosic material to cure at room temperature and without application of pressure.

2. The process of claim 1, wherein said polymethylene poly(phenyl isocyanate) has an isocyanate group content of from 31 to 32% by weight.

3. The process of claim 2, wherein said organic compound has a molecular weight of from about 100 to about 4000.

* * * * *